UNITED STATES PATENT OFFICE.

CARLETON ELLIS, OF WHITE PLAINS, NEW YORK, ASSIGNOR TO CHADELOID CHEMICAL COMPANY, OF NEW YORK, N. Y., A CORPORATION OF WEST VIRGINIA.

PAINT AND VARNISH REMOVER.

994,139.     Specification of Letters Patent.     Patented June 6, 1911.

No Drawing.     Application filed November 26, 1906. Serial No. 345,040.

*To all whom it may concern:*

Be it known that I, CARLETON ELLIS, a citizen of the United States, and resident of White Plains, in the county of Westchester and State of New York, have invented certain new and useful Improvements in Paint and Varnish Removers, of which the following is a specification.

This invention relates to paint and varnish removers and relates especially to removers comprising butyrone and its isomers, the other heptyl ketones having the formula $C_7H_{14}O$.

Butyrone may be readily prepared through the fermentation of starch or similar material and the subsequent destructive distillation of the products. This may be conveniently accomplished by making a solution of starch, sugar, milk sugar, dextrose or skimmed milk in water, which in case starch is used may be accomplished by boiling. Thereafter precipitated calcium carbonate, for example, to the extent of about half the weight of starch is preferably incorporated with the solution. This solution can be inoculated with any of the butyric bacteria and if maintained at a temperature, preferably between 37° and 40° C. for several weeks butyric fermentation takes place, producing through the reaction upon the calcium carbonate calcium butyrate and some allied bodies. When sufficiently fermented this material may be filtered to remove the remaining suspended material and on boiling the calcium butyrate is precipitated and may be readily separated by filtration from the other allied fermentation products. This butyrate is preferably dried and subjected to destructive distillation in suitable apparatus, preferably at as low a temperature as possible or at a uniform temperature with very rapid agitation to prevent local overheating, a vacuum being preferably employed during this operation, and the temperature being preferably kept below 400° C. so that no part of the material is subjected to an injurious temperature. The vapors of the butyrone or other heptyl ketones, that is, ketones having seven carbon atoms are led through a condenser and condensed. This process gives as well as the strict butyrone or 4-heptanon some iso butyrone or iso-dipropyl ketone, other heptyl ketones, such as methyl amyl ketone and ethyl butyl ketone, the formula of all these bodies being $C_7H_{14}O$. It is, of course, understood that the butyrone and other heptyl ketones may be produced, if desired, in other ways, the method previously described being merely an illustrative one for producing them commercially, in which, of course, the desired fermentation may be promoted by such well known means as the employment of nutrient and phosphatic or other materials familiar in bacteriological work. These heptyl ketones may be used in removers preferably after the incorporation of stiffening material, such as wood flour, starch, whiting, infusorial earth, or the like, and wax may also be used for this purpose and to form an impervious evaporation retarding film which assists the operation under extreme service conditions. Other solvents, such as alcoholic bodies, benzol, or its equivalents, may be used with advantage.

A desirable remover may be prepared by dissolving six parts of paraffin or ceresin wax in 25 parts of benzol or its homologues, or similar hydrocarbon wax solvents and then incorporating 75 parts of heptyl ketones, preferably butyrone, and 25 parts of wood alcohol or other similar alcoholic bodies, although such ingredients may, of course, be combined in any order and incorporated by heating and agitation. It is, of course, unnecessary in all cases to employ the benzol or similar solvents or the wax mentioned, and other stiffening material may naturally be substituted for the wax when desired for many classes of work.

Another desirable remover may be made by incorporating two parts of waxy bodies, such as, for example, paraffin or ceresin wax, with 90 parts of heptyl ketones, preferably butyrone, and suitable stiffening material may be used in the form of eight parts of wood flour, the lightest air separated product derived from sawdust and similar material being most desirable, although, of course, the wax may also be omitted in some cases.

Having thus described this invention in connection with several illustrative examples, to the details of which it is not, of course, to be limited, what is claimed as new and what is desired to be secured by Letters Patent is set forth in the appended claims.

1. The remover for paint or varnish comprising butyrone about 75 parts, alcoholic bodies about 25 parts, aromatic hydrocarbon wax solvents about 25 parts and wax about 6 parts.

2. The remover for paint or varnish comprising approximately butyrone 75 parts, alcoholic bodies 25 parts, aromatic hydrocarbon wax solvents including benzol 25 parts and ceresin wax 6 parts.

3. The remover for paint or varnish comprising approximately butyrone 75 parts, wood alcohol 25 parts, benzol 25 parts and ceresin wax 6 parts.

4. The remover for paint or varnish comprising approximately butyrone 75 parts, wood alcohol 25 parts, aromatic solvents 25 parts and wax 6 parts.

5. The substantially fluent remover for paint or varnish comprising approximately seventy-five parts of neutral keytone solvents having seven carbon atoms, alcoholic bodies twenty-five parts, aromatic hydrocarbon wax solvent material twenty-five parts and incorporated wax.

6. The substantially fluent remover for paint or varnish comprising approximately seventy-five parts of substantially neutral keytone solvents having seven carbon atoms, approximately fifty parts of incorporated solvent material including an alcoholic body and waxy stiffening material.

7. The substantially fluent remover for paint or varnish comprising approximately seventy-five parts of ketone solvents having seven carbon atoms, wood alcohol twenty-five parts, aromatic finish solvent material twenty-five parts, and incorporated stiffening material.

8. The substantially fluent remover for paint or varnish consisting essentially of composite volatile organic finish softening material comprising a large proportion of butyrone and incorporated alcoholic finish solvent material and stiffening material including dissolved wax.

9. The substantially fluent remover for paint or varnish consisting essentially of substantially neutral volatile organic finish softening material comprising a large proportion of neutral keytone solvents having seven carbon atoms and incorporated stiffening material including dissolved wax.

CARLETON ELLIS.

Witnesses:
HARRY L. DUNCAN,
JESSIE B. KAY.